US005911445A

United States Patent [19]

Lee

[11] Patent Number: 5,911,445

[45] Date of Patent: Jun. 15, 1999

[54] HOSE COUPLING WITH SAFETY LOCKING MEANS

[76] Inventor: Shen-Chih Lee, No. 3, Lane 118, Tzyh Chyang Rd., Dann Shoei Chen, Taipei Hsien, Taiwan

[21] Appl. No.: 08/976,654

[22] Filed: Nov. 24, 1997

[51] Int. Cl.[6] .................... F16L 55/00

[52] U.S. Cl. .................... 285/84; 285/85; 285/312; 285/81

[58] Field of Search .................... 285/84, 85, 86, 285/312, 81

[56] References Cited

U.S. PATENT DOCUMENTS

| | | | |
|---|---|---|---|
| 554,666 | 2/1896 | Feltner | 285/85 |
| 789,541 | 5/1905 | Hayes | 285/85 |
| 808,446 | 12/1905 | Gill et al. | 285/85 |
| 966,925 | 8/1910 | Kittredge | 285/85 |
| 4,222,593 | 9/1980 | Lauffenburger | 285/312 |
| 5,295,717 | 3/1994 | Chen | 285/84 |
| 5,338,069 | 8/1994 | McCarthy | 285/312 |
| 5,435,604 | 7/1995 | Chen | 285/84 |
| 5,722,697 | 3/1998 | Chen | 285/312 |

*Primary Examiner*—Eric K. Nicholson
*Attorney, Agent, or Firm*—Bacon & Thomas

[57] ABSTRACT

A hose coupling which includes a coupling body having two side openings and two pair of lugs at two opposite sides of each side opening, two locking levers pivotably coupled to the lugs at two opposite sides of the coupling body by a respective pivot and turned between a locking position to lock a plug/male connecting element in the coupling body and an unlocking position to release the plug/male connecting element, two retainer plates respectively coupled to the pivots and disposed outside the side openings of the coupling body and adapted to stop the locking levers in the locking position, and two spring and pin sets respectively mounted in stepped holes on the locking levers and adapted to engage with retainer plates in stopping the locking levers in the locking position, each spring and pin set having a knob for release control.

6 Claims, 5 Drawing Sheets

HOSE COUPLING WITH SAFETY LOCKING MEANS

BACKGROUND OF THE INVENTION (a) Field of the Invention

The present invention relates to hose couplings, and more particularly to such a hose coupling which has means to stop the locking levers thereof in position when the locking levers are turned to a locking position to lock a plug/male connecting element in the coupling body thereof.

(b) Description of the Prior Art

A regular hose coupling is generally comprised of a female connector and a male connector connected to the female connector. The female connector comprises two side openings, and two locking levers pivoted to its two opposite sides and turned in and out of the side openings to lock/unlock the male connector. When locked, the locking levers tend to be forced out of the locking position when the hose coupling is vibrated. U.S. Pat. No. 3,124,374 shows a hose coupling design in which the female connector comprises a clamping lever and a locking lever at each side, and an arrangement which includes spring, pin, face and button is provided at each side for holding down the corresponding locking lever in the locking position. This design of hose coupling is functional, however its maintenance work is complicated. Similar designs are seen in U.S. Pat. Nos. 4,871,195; 4,295,670. These designs commonly use detachable locking pin to the locking lever in the locking position.

SUMMARY OF THE INVENTION

The present invention has been accomplished to provide a hose coupling which uses spring and pin sets to act with two retainer plates in holding down the locking levers in the locking position. When any element of the hose coupling is damaged, it can be conveniently dismounted for a replacement. According to the present invention, the hose coupling comprises a coupling body having two side openings and two pair of lugs at two opposite sides of each side opening, two locking levers pivotably coupled to the lugs at two opposite sides of the coupling body by a respective pivot and turned between a locking position to lock a plug/male connecting element in the coupling body and an unlocking position to release the plug/male connecting element, two retainer plates respectively coupled to the pivots and disposed outside the side openings of the coupling body and adapted to stop the locking levers in the locking position, and two spring and pin sets respectively mounted in stepped holes on the locking levers and adapted to engage with retainer plates in stopping the locking levers in the locking position, each spring and pin set having a knob for release control.

DETAILED DESCRIPTION OF THE PREFERRED EMBODIMENT

Figure 1:
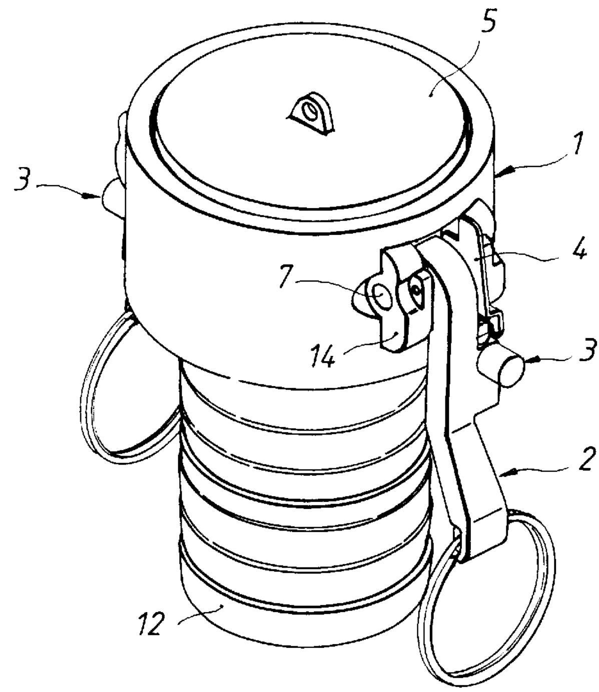
FIG. 1 is a perspective view of the present invention, showing a plug locked in the coupling body of the hose coupling.
Figure 2:
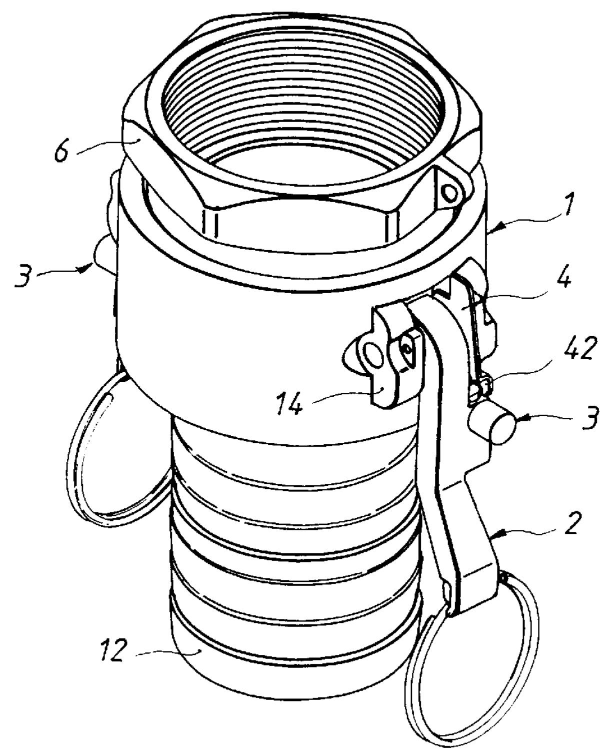
FIG. 2 is another perspective view of the present invention, showing a male connecting element locked in the coupling body of the hose coupling.
Figure 3:
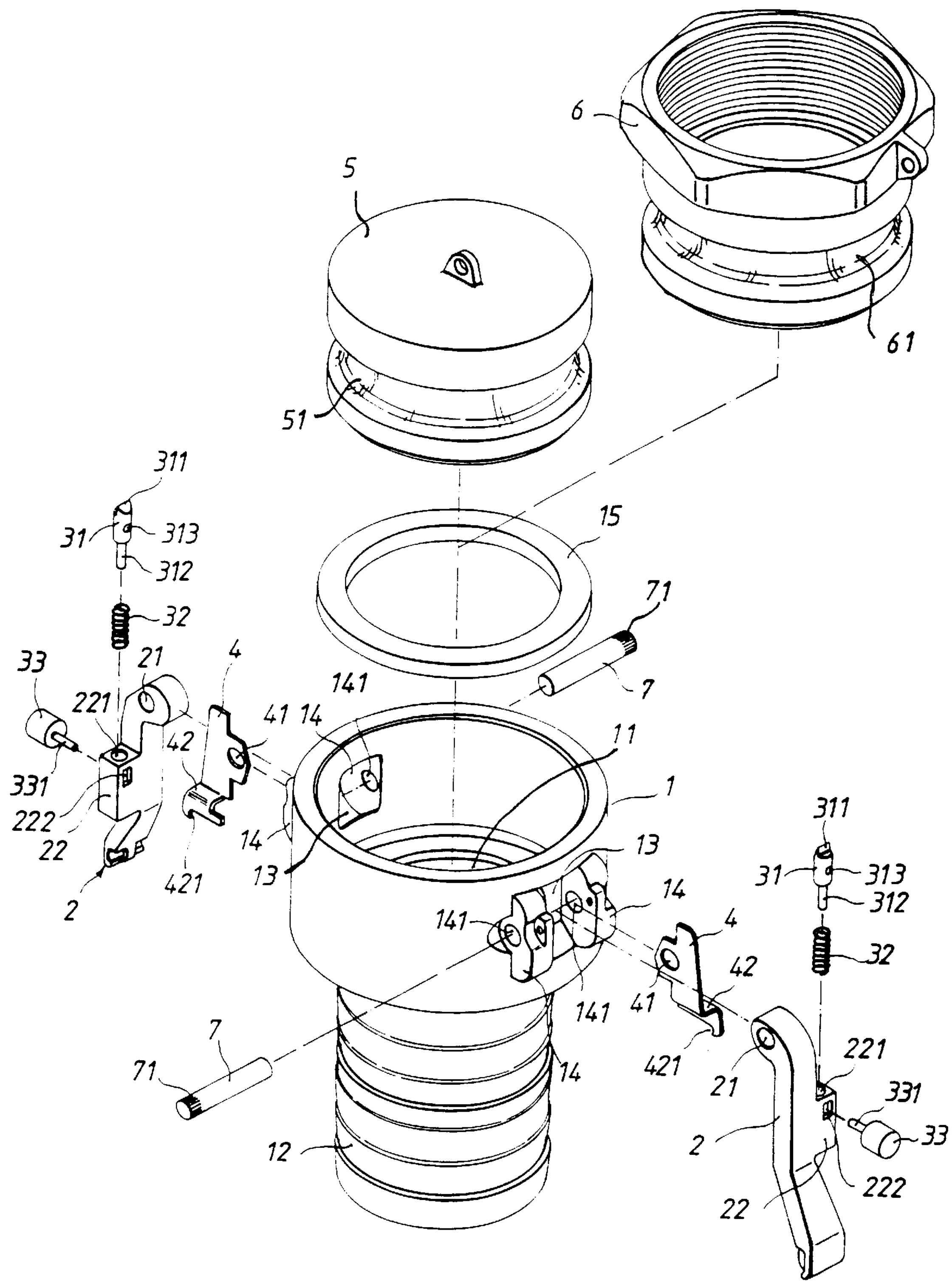
FIG. 3 is an exploded view of the present invention.

Referring to FIGS. 1, 2 and 3, a hose coupling in accordance with the present invention is generally comprised of a coupling body 1, two locking levers 2, two spring and pin sets 3, two retainer plates 4, and a plug 5 or male connecting element 6.

The coupling body 1 is fixedly connected to one end of a tube 12, comprising a center hole 11 which holds a gasket ring 15 and the plug 5 or male connecting element 6 on the gasket ring 15, two side openings 13 at two opposite sides in communication with the center hole 11, and two pair of lugs 14 respectively raised from the periphery at two opposite sides of each side opening 13. Each pair of lugs 14 have a respective pivot hole 141 aligned with each other.

Each locking lever 2 comprises a pivot hole 21 at one end, and a block 22 raised from its one side on the middle. The block 22 comprises a stepped hole 221 longitudinally disposed in parallel to the locking lever 2, and an oblong hole 222 intersected with the stepped hole 221.

Each spring and pin set 3 comprises a stop pin 31, a spring 32, and a knob 33. The stop pin 31 is a stepped cylindrical member having an upwardly extended bevel projection 311 raised from its top side, an extension rod 312 axially downwardly extended from its bottom side, and a transverse through hole 313 on the middle. The spring 32 is mounted around the extension rod 312 of the stop pin 31, and adapted to impart an upward pressure to the stop pin 31. The knob 33 is a cylindrical member having an extension rod 331 extended from its one end.

Each retainer plate 4 comprises a pivot hole 41 at a front side thereof, an angle tail 42 extended sideways from a bottom side thereof and terminating in a hooked portion 421.

The spring and pin sets 3 are respectively mounted in the blocks 22 of the locking levers 2 by: inserting the stop pins 31 and springs 32 of the spring and pin sets 3 in the stepped holes 221 on the blocks 22 of the locking levers 2, permitting the springs 32 to be respectively mounted around the respective stop pins 31, and then inserting the extension rods 331 of the knobs 33 of the locking levers 2 through the oblong holes 222 on the respective blocks 22 into the transverse through holes 313 on the respective stop pins 31. When the spring and pin sets 3 are installed, the knobs 33 can be moved up and down in the respective oblong holes 222, causing the respective stop pins 31 to extend their bevel projections 311 out of the respective stepped holes 221, or to move their bevel projections 311 back to the inside of the respective stepped holes 221.

Figure 4:
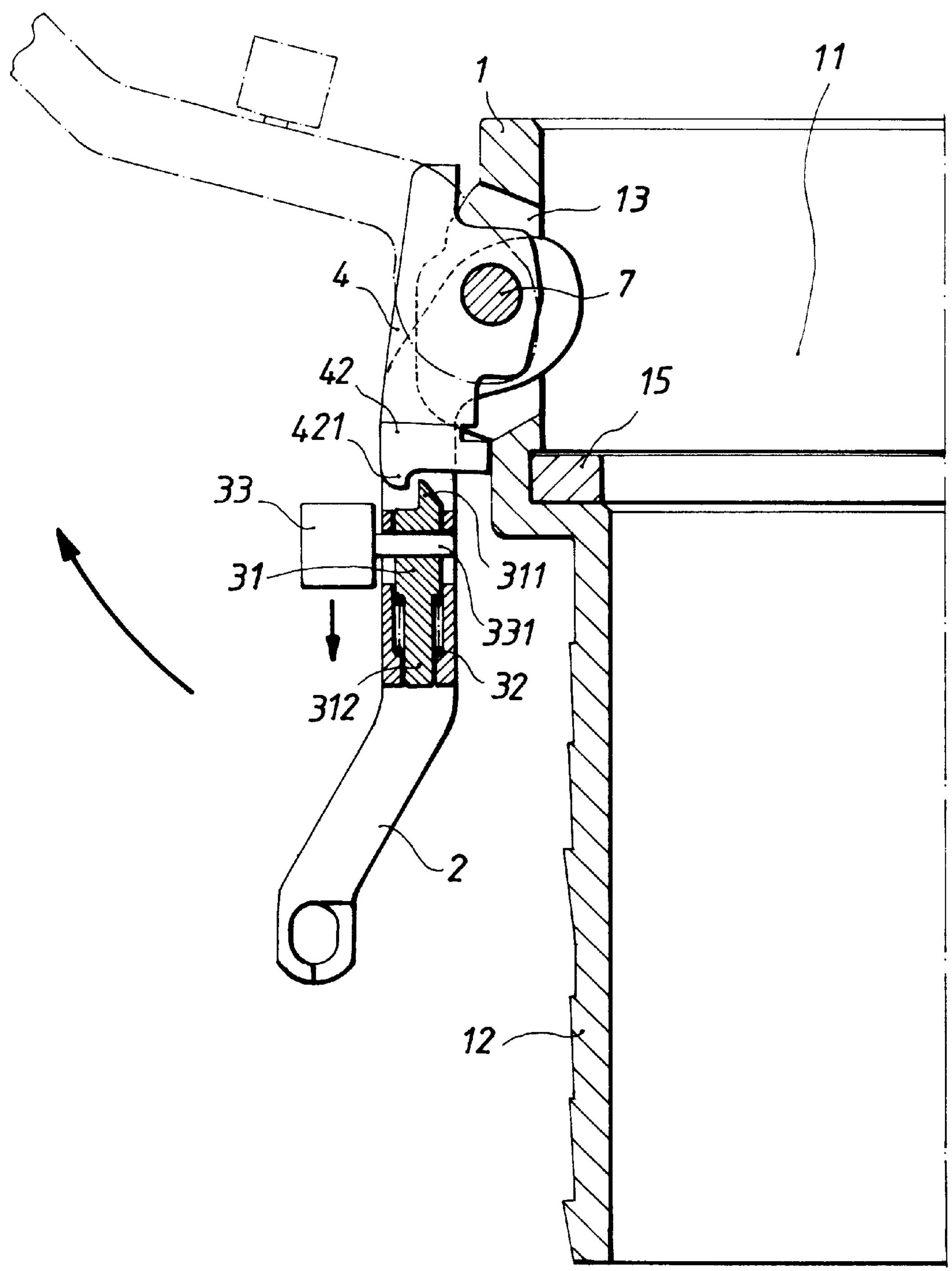
FIG. 4 is a schematic drawing showing the locking lever turned between the locking position and the unlocking position according to the present invention.
Figure 5:
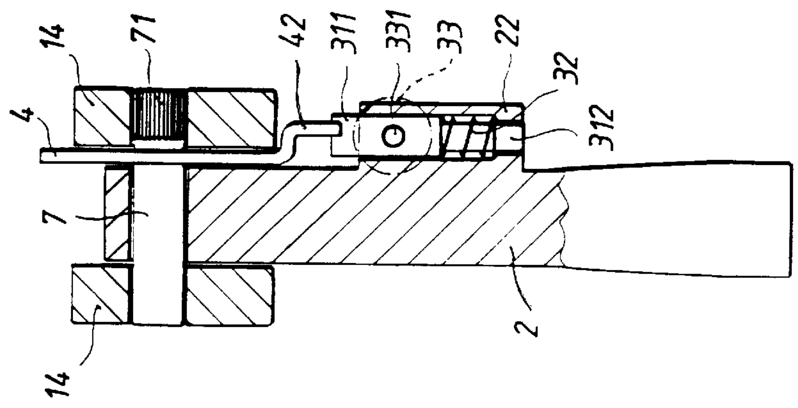
FIG. 5 is a side view in section in an enlarged scale of a part of the present invention, showing the locking lever locked in the locating position.

After the spring and pin sets 3 have been respectively installed in the blocks 22 of the locking levers 2, the locking levers 2 and the retainer plates 4 are respectively coupled to the lugs 14 of the coupling body 1 by inserting the front ends of the locking levers 2 and retainer plates 4 into the side openings 13 of the coupling body 1, then inserting two pivots 7 into the pivot holes 141 on the lugs 14, the pivot holes 21 on the locking levers 2 and the pivot holes 41 on the retainer plates 4. Each pivot 7 has a toothed section 71 at one end disposed in the pivot hole 141 of one lug 14. After the locking levers 2 and the retainer plates 4 have been coupled to the lugs 14 of the coupling body 1, the plug 5 or male connecting element 6 is mounted in the center hole 11 of the coupling body 1 and supported on the gasket ring 15, and then the locking levers 2 are respectively pressed down, causing the front ends of the locking levers 2 to be respectively engaged into the annular groove 51 or 61 around the periphery of the plug 5 or male connecting element 6 (see FIG. 4), and at the same time the bevel projections 311 of the stop pins 31 of the spring and pin sets 3 are respectively forced into engagement with the hooked portions 421 of the respective retainer plates 4 (see FIG. 5), and therefore the locking levers 2 are locked.

Figure 7:
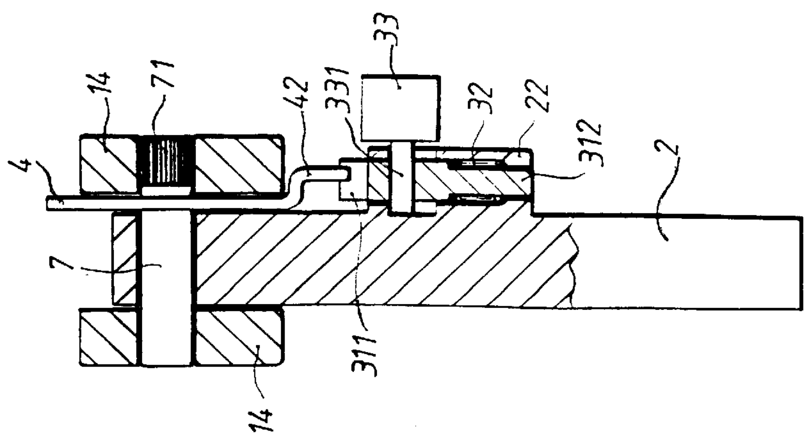
FIG. 7 is a sectional assembly view of FIG. 6.
Figure 6:
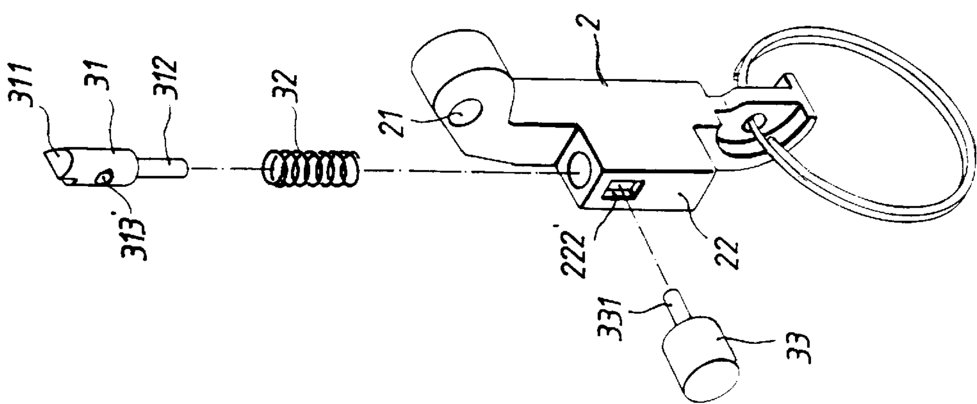
FIG. 6 is an exploded view of an alternate form of the locking lever and the spring and pin set according to the present invention.

FIGS. 6 and 7 show an alternate arrangement of the present invention, in which the oblong hole 222' is made on another side of the block 22 of the locking lever 2, and the transverse through hole 313' is made on the stop pin 31 in direction corresponding to the oblong hole 222' on the block 22 of the locking lever 2. This design prevent a direct contact of the knob 33 with the floor when the hose coupling is drag on the floor.

When one element of either spring and pin set 3 is damaged, the extension rod 331 of the knob 33 can be cut with cutting means, permitting the spring 32, stop pin 31 and knob 33 of the respective spring and pin set 3 to be disconnected from the respective locking lever 2 for a replacement. When to replace the locking lever 2, a tool is used to give a pressure to the toothed section 71 of the respective pivot 7 and to push the respective pivot 7 out of the respective lugs 14, so that the locking lever 22 can be disconnected from the coupling body 1 for a replacement. Further, the hose coupling is ergonomically engineered. When to unlock the locking lever 2, the thumb 33 is pressed on the knob 33 to push it downwards, and then the locking lever 3 is turned upwards from the locking position to the unlocking position with the same hand.

Figure 8:
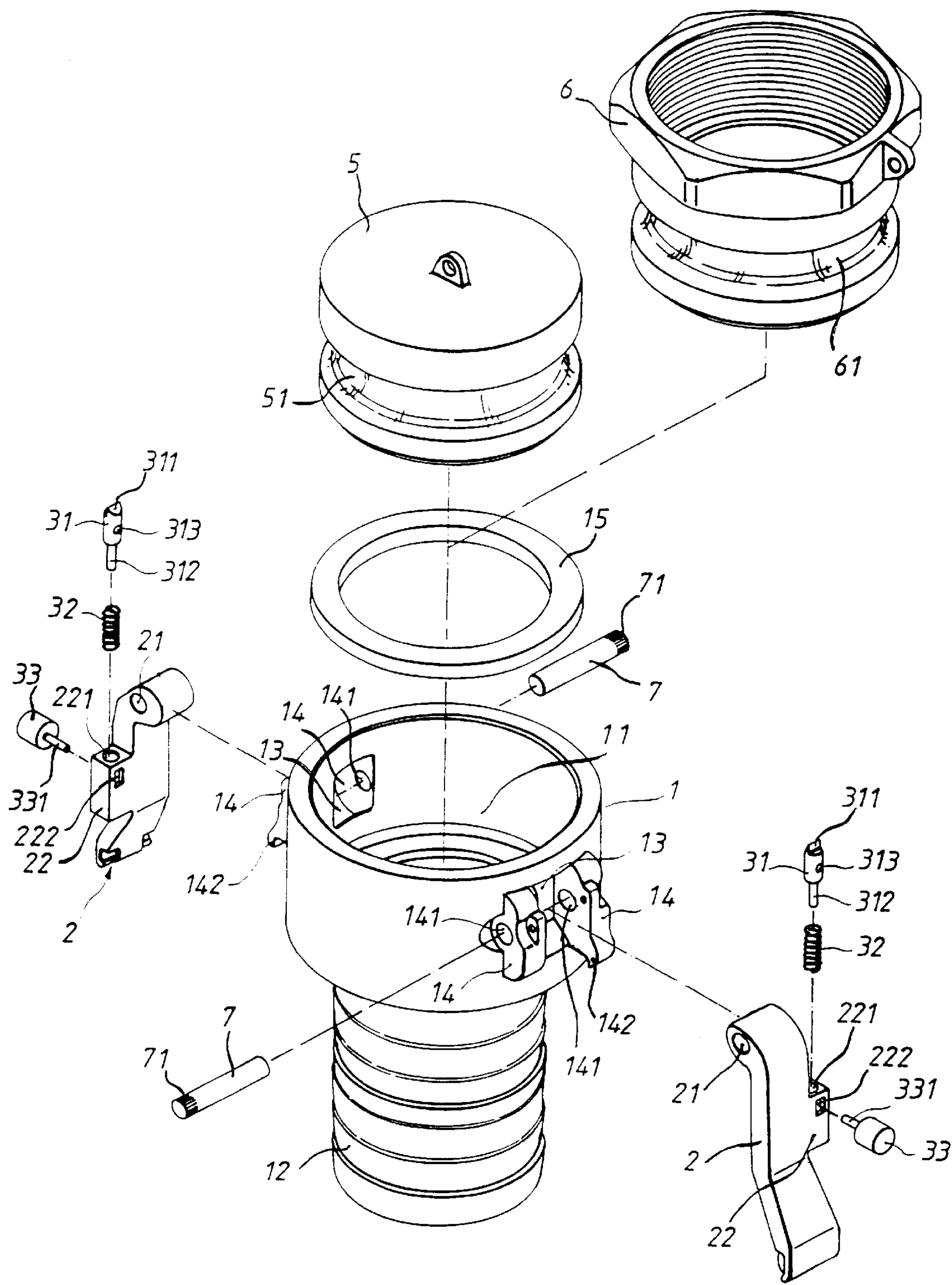
FIG. 8 is an exploded view of an alternate form of the hose coupling according to the present invention.

FIG. 8 shows an alternate form of the present invention. According to this alternate form, the aforesaid retainer plates 4 are eliminated, and two hooked portions 142 are respectively integral with one lug 14 at each side for engaging the bevel projection 311 of the respective spring and pin set 3.

It is to be understood that the drawings are designed for purposes of illustration only, and are not intended as a definition of the limits and scope of the invention disclosed.

What the invention claimed is:

1. A hose coupling comprising:

a coupling body fixedly connected to one end of a tube, said coupling body comprising a center hole adapted to receive a plug/male connecting element, two side openings at two opposite sides in communication with said center hole, and two pairs of lugs respectively raised from the periphery at two opposite sides of each of said side openings, said lugs having a respective pivot hole disposed at same elevation;

two pivots respectively mounted in the pivot holes of said two pairs of lugs at two opposite sides of said coupling body, said pivots having a respective toothed section at one end respectively disposed in the pivot hole of one lug at each side;

two locking levers respectively turned about said pivots between a locking position where said locking levers are respectively moved into the side openings of said coupling body to be forced into engagement with an annular groove around a periphery of a plug/male connecting element to be mounted in the center hole of said coupling body, and an unlocking position where said locking levers are respectively moved out of the side openings of said coupling body to be disengaged from an annular groove on a plug/male connecting element to be dismounted from the center hole of said coupling body, said locking levers each comprising a pivot hole at one end adapted for coupling to said pivots, and a block raised from one side on the middle, said block comprising a stepped hole disposed in parallel to the respective locking lever, and an oblong hole intersected with said stepped hole;

retainer means respectively disposed at two opposite sides of said coupling body and adapted to stop said locking levers in said locking position; and two spring and pin sets respectively mounted in the stepped holes on the blocks of said locking levers and adapted to engage with said retainer means in stopping said locking levers in said locking position, each of said spring and point sets comprising a stepped stop pin mounted in the stepped hole on the block of one locking lever, a spring mounted in the stepped hole on the block of one locking lever and imparting an upward pressure to said stop pin, causing said stop pin to be extended out of said stepped hole into engagement with said retainer means, and a knob mounted in the oblong hole on the block of one locking lever and connected to said stop pin and adapted to move said stop pin away from said retainer means for permitting the respective locking lever to be turned from said locking position to said unlocking position;

wherein said retainer means comprises two retainer plates respectively coupled to said pivots between each two lugs of said two pairs of lugs at one side of said locking levers and stopped outside the side openings of said coupling body, said retainer plates having a respective angle tail respectively terminating in a hooked portion adapted to engage the stop pins of said spring and pin sets.

2. The hose coupling of claim 1, wherein the oblong hole on the block of each of said locking levers is disposed at an outer side of the respective block opposite to said connecting body.

3. The hose coupling of claim 1, wherein the oblong hole on the block of each of said locking levers is disposed at one lateral side of the respective block.

4. A hose coupling according to claim 1, comprising:

a coupling body fixedly connected to one end of a tube, said coupling body comprising a center hole adapted to receive a plug/male connecting element, two side openings at two opposite sides in communication with said center hole, and two pairs of lugs respectively raised from the periphery at two opposite sides of each of said side openings, said lugs having a respective pivot hole disposed at same elevation;

two pivots respectively mounted in the pivot holes of said two pairs of lugs at two opposite sides of said coupling body, said pivots having a respective toothed section at one end respectively disposed in the pivot hole of one lug at each side;

two locking levers respectively turned about said pivots between a locking position where said locking levers are respectively moved into the side openings of said coupling body to be forced into engagement with an annular groove around a periphery of a plug/male connecting element to be mounted in the center hole of said coupling body, and an unlocking position where said locking levers are respectively are respectively moved out of the side openings of said coupling body to be disengaged from an annular groove on a plug/male connecting element to be dismounted from the center hole of said coupling body, said locking levers each comprising a pivot hole at one end adapted for coupling to said pivots, and a block raised from one side on the middle, said block comprising a stepped hole disposed in parallel to the respective locking lever, and an oblong hole intersected with said stepped hole;

retainer means respectively disposed at two opposite sides of said coupling body and adapted to stop said locking levers in said locking position; and two spring and pin sets respectively mounted in the stepped holes on the blocks of said locking levers and adapted to engage with said retainer means in stopping said locking levers in said locking position, each of said spring and point sets comprising a stepped stop pin mounted in the stepped hole on the block of one locking lever, a spring mounted in the stepped hole on the block of one locking lever and imparting an upward pressure to said stop pin, causing said stop pin to be extended out of said stepped hole into engagement with said retainer means, and a knob mounted in the oblong hole on the block of one locking lever and connected to said stop pin and adapted to move said stop pin away from said retainer means for permitting the respective locking lever to be turned from said locking position to said unlocking position;

wherein said retainer means comprises two angle tails formed integrally with one lug of each of said two pairs of lugs, each of said angle tails terminating in a hooked portion adapted to engage the stop pins of said spring and pin sets.

5. The hose coupling of claim 4, wherein the oblong hole on the block of each said locking levers is disposed at an outer side of the respective block opposite to said connecting body.

6. The hose coupling of claim 4, wherein the oblong hole on the block of each of said locking levers is disposed at one lateral side of the respective block.

* * * * *